United States Patent
Chiang

(10) Patent No.: US 8,411,147 B2
(45) Date of Patent: Apr. 2, 2013

(54) METHOD FOR ELIMINATING CHROMATIC ABERRATION CAUSED BY AN IMAGING ENVIRONMENT AND FOR TESTING STABILITY OF THE IMAGING ENVIRONMENT, AND CHROMATIC ABERRATION CALIBRATION DEVICE FOR USE WITH THE SAME

(76) Inventor: Chiung-Hung Chiang, Taipei (TW)

( * ) Notice: Subject to any disclaimer, the term of this patent is extended or adjusted under 35 U.S.C. 154(b) by 376 days.

(21) Appl. No.: 12/901,586

(22) Filed: Oct. 11, 2010

(65) Prior Publication Data
US 2012/0086811 A1   Apr. 12, 2012

(51) Int. Cl.
*H04N 17/02* (2006.01)
(52) U.S. Cl. .................. 348/187; 348/180
(58) Field of Classification Search ............ 348/187, 348/180, 655, 658, 603, 649, 645, 77, 135, 348/143; 382/167, 275; 702/85; 342/165, 342/174; 358/504, 518; *H04N 17/00, 17/02, H04N 7/18, 5/58, 9/64, 9/68, 9/73*
See application file for complete search history.

(56) References Cited

U.S. PATENT DOCUMENTS

| 2010/0027886 A1* | 2/2010 | Kang et al. | 382/167 |
| 2011/0013097 A1* | 1/2011 | Freeman et al. | 348/745 |

\* cited by examiner

*Primary Examiner* — Sherrie Hsia

(57) ABSTRACT

A method for eliminating chromatic aberration caused by an imaging environment and for testing stability of the imaging environment, and; a chromatic aberration calibration device are disclosed. The method serves to detect errors resulting from environmental factors and human factors and, by using a specific measurement distance and angle, eliminate chromatic aberration caused by such factors. Environmental factors include variations of the image capture device itself; the hue, lightness, and chroma of external light; and the distance and angle between the chromatic aberration calibration device and the image capture device. Human factors include operator-related variations, focusing variations, and hand tremor during measurement. When the same chromatic aberration calibration device and imaging environment are used, the method can show color variations caused by the environmental and human factors in the image capture process and thereby determine whether the imaging environment has the expected stability.

6 Claims, 4 Drawing Sheets

METHOD FOR ELIMINATING CHROMATIC ABERRATION CAUSED BY AN IMAGING ENVIRONMENT AND FOR TESTING STABILITY OF THE IMAGING ENVIRONMENT, AND CHROMATIC ABERRATION CALIBRATION DEVICE FOR USE WITH THE SAME

BACKGROUND OF THE INVENTION

1. Technical Field

The present invention relates to a method for increasing the stability of an imaging environment. More particularly, the present invention relates to a method for eliminating chromatic aberration caused by an imaging environment and for testing stability of the imaging environment, and a chromatic aberration calibration device for use with the same method.

2. Description of Related Art

The development of diagnostic imaging in the 21st century consists in high-resolution diagnostic imaging, high-speed image transmission, and the provision of a more user-friendly and environment-friendly medical environment. For instance, digital X-ray photography has replaced the traditional X-ray photography to enhance image quality and reduce patients' radiation exposure. Also, high-resolution color digital image capture techniques have played an important role in applied medicine. As a notable example, the tongue diagnosis device in traditional Chinese medicine uses a high-resolution color digital camera to record the colors of a patient's tongue. Then, the color contrast range of the digital data obtained is modified by computer image processing, or the original image is enhanced by other computational methods, so as to produce a precise image for examination by doctors. A doctor only has to input the patient's personal data, such as the medical record number, into the terminal to view the image and make diagnosis accordingly. Thus, the patient waiting time can be shortened to increase working efficiency and lower the cost of labor.

However, when a digital imaging device is used to capture images, errors may arise from the measuring instrument itself, human factors, or environmental factors. For instance, when the same operator is in charge of capturing images of the same sample at the same location repeatedly, the repeated action may result in numerical variation which can be accounted for by variation of the measuring tool itself during measurement. When different operators are in charge of measuring the same sample at the same location, variation of the measurements is most likely attributable to human factors. The images obtained may also be affected by environmental factors in the image capture process, such as the variation of hue, lightness, and chroma of light. All the aforesaid variations are causes of chromatic aberration, which in turn may lead to misjudgment by the operators.

The problem described above has yet to be solved by persons skilled in the art.

SUMMARY OF THE INVENTION

In view of the foregoing drawback of the prior art, the inventor of the present invention proposes a method for eliminating chromatic aberration caused by an imaging environment and for testing stability of the imaging environment, and a chromatic aberration calibration device for use with the same method, so as to detect and eliminate the chromatic aberration-causing factors in the imaging environment.

The primary object of the present invention is to provide a method for eliminating chromatic aberration caused by an imaging environment and for testing stability of the imaging environment. When an image capture device is used to capture images, chromatic aberration may result from environmental factors as well as human factors. The environmental factors include variations of the image capture device itself; the hue, lightness, and chroma of external light; and the distance and angle between the chromatic aberration calibration device and the image capture device. The human factors, on the other hand, include operator-related variations, focusing variations, and hand tremor during measurement. The method serves to eliminate variations caused by the environmental factors and human factors in the image capture process and thereby produce images whose colors are similar to those of the original object.

The secondary object of the present invention is to provide a chromatic aberration calibration device for calibrating the image capture angle of an imaging device so as to obtain the optimal color contrast between the subject and the background. The chromatic aberration calibration device of the present invention uses a hollow semi-ellipsoidal model to simulate the lower half portion of the human face. The semi-ellipsoid has a central portion provided with a three-dimensional projection. In addition, the semi-ellipsoidal model has two positioning points, a set of viewing angle calibration patterns, a coordinate scale, and an angular measurement scale. The chromatic aberration calibration device is characterized by a sharp color contrast between the three-dimensional projection and the semi-ellipsoid. The sharp color contrast serves to accentuate chromatic aberration of the three-dimensional projection and thereby enhance test results. In use, a digital imaging device whose shooting angle needs calibration takes a series of repeated images of the chromatic aberration calibration device so as to calibrate the shooting angle and consequently allow images to be captured to have the optimal color contrast.

BRIEF DESCRIPTION OF THE DRAWINGS

A detailed description of further features and advantages of the present invention is given below with reference to the accompanying drawings, in which.

DETAILED DESCRIPTION OF THE PREFERRED EMBODIMENT

The preferred embodiments of the present invention are demonstrated herein with reference to the accompanying drawings so that a person of ordinary skill in the art can understand the aforesaid objects and implement the present invention according to the contents disclosed herein.

Figure 1:
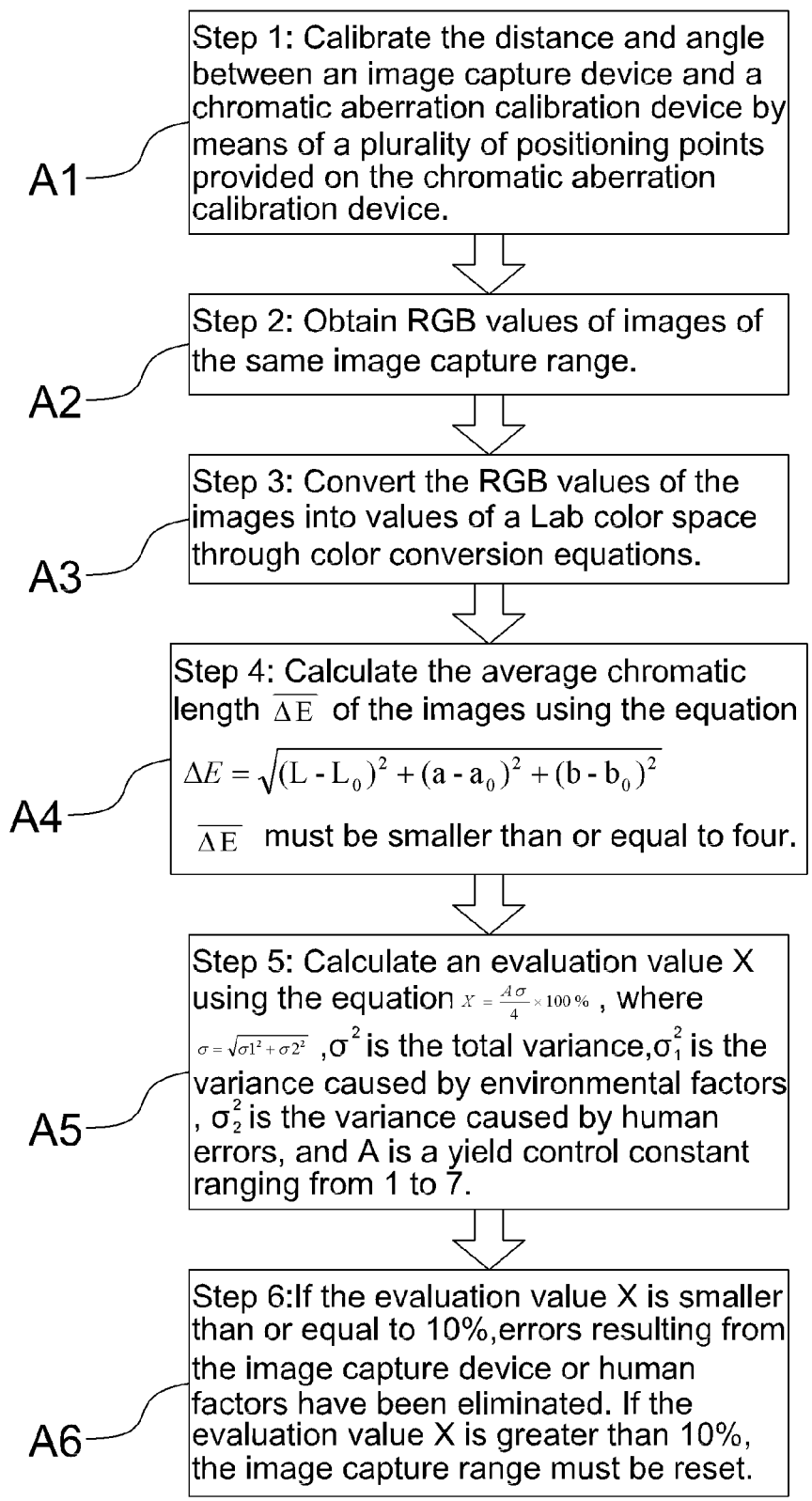
FIG. 1 is Flowchart 1 of the present invention.
Figure 2:
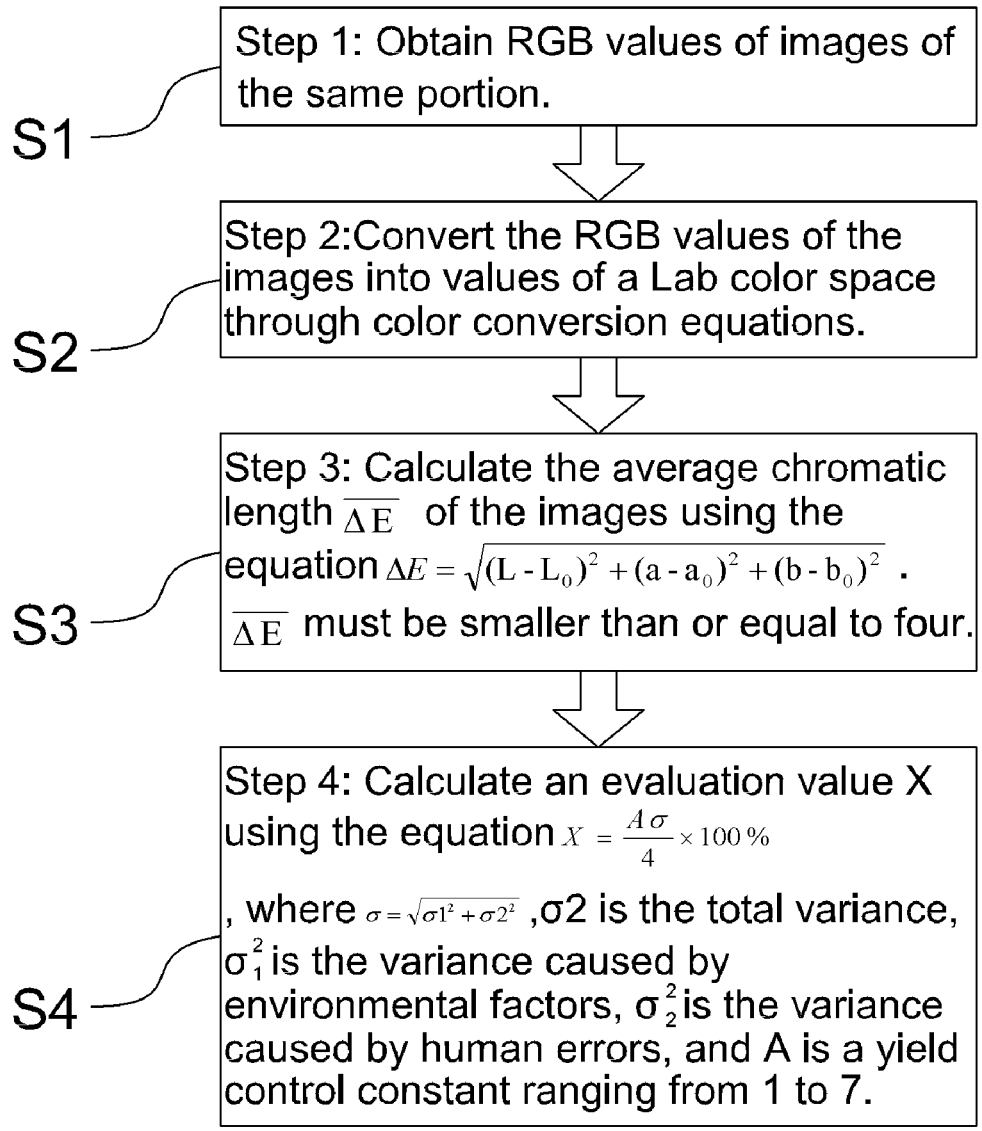
FIG. 2 is Flowchart 2 of the present invention.

Referring to FIG. 1 and FIG. 2 for Flowcharts 1 and 2 of the present invention, a method for eliminating chromatic aberration caused by an imaging environment and for testing stability of the imaging environment is provided to control errors resulting from an image capture device and human factors. The method includes the following steps:

(1) To set an image capture range: The distance between the image capture device and a chromatic aberration calibration device and the angle of the former with respect to the latter are calibrated according to a plurality of positioning points provided on the chromatic aberration calibration device.

(2) To obtain image values: A camera, such as a high-resolution color digital camera, a CCD camera, and a web video device, is used to capture images of the chromatic aberration calibration device, with a view to obtaining the pixel RGB values of the images. More specifically, images are taken repeatedly of the same image capture range of the chromatic aberration calibration device in order to obtain the pixel RGB values of a plurality of identical positions in the images.

(3) To convert color spaces: The pixel RGB values of the plural identical positions in the images are converted into values of a Lab color space by a set of color conversion equations. This set of equations convert the pixel RGB values into XYZ values; the XYZ values into $f_x$, $f_y$, $f_z$; and $f_x$, $f_y$, $f_z$ into values of a Lab color space. Color space conversion via the color conversion equations is carried out as follows:

(a) The pixel RGB values are weighted with different parameters at different ratios to produce XYZ values:

$$X = 0.490R + 0.310G + 0.200B,$$

$$Y = 0.177R + 0.812G + 0.011B,$$

$$Z = 0.010G + 0.990B;$$

(b) The XYZ values are converted into values of a Lab color space in the following manner:

(b-1) To determine $x_r$, $y_r$, $z_r$: First of all, a set of values corresponding to a reference white color are set as $(X_r, Y_r, Z_r)$. Then, the XYZ values obtained from Step (a) are substituted into the following equations:

$$x_r = \frac{X}{X_r}, \quad y_r = \frac{Y}{Y_r}, \quad z_r = \frac{Z}{Z_r},$$

thereby converting $(X, Y, Z)$ into $(x_r, y_r, z_r)$;

(b-2) To determine $f_x$, $f_y$, $f_z$: $(x_r, y_r, z_r)$ is substituted into the following equations, according to the applicable conditions, to produce $(f_x, f_y, f_z)$:

$$f_x = \begin{cases} \sqrt[3]{x_r} & x_r > 0.00886 \\ \dfrac{kx_r + 16}{116} & x_r \leq 0.00886 \quad k = 903.3 \end{cases},$$

$$f_y = \begin{cases} \sqrt[3]{y_r} & y_r > 0.00886 \\ \dfrac{ky_r + 16}{116} & y_r \leq 0.0086 \quad k = 903.3 \end{cases},$$

$$f_z = \begin{cases} \sqrt[3]{z_r} & z_r > 0.00886 \\ \dfrac{kz_r + 16}{116} & z_r \leq 0.00886 \quad k = 903.3; \end{cases}$$

(b-3) To determine (L,a,b): Finally, $(f_x, f_y, f_z)$ is converted into (L,a,b) using the following equations:

$$L = 116 f_y - 16,$$

$$a = 500(f_x - f_y),$$

$$b = 200(f_y - f_z).$$

Through the foregoing equations, each set of XYZ values are converted into (L,a,b).

(4) To calculate the average chromatic length: The chromatic length of a particular measurement point is calculated as follows:

$\Delta E = \sqrt{(L-L_0)^2 + (a-a_0)^2 + (b-b_0)^2}$, where $(L_0, a_0, b_0)$ is a set of reference values, and (L,a,b) represents other measured values. The chromatic lengths $\Delta E$ of different positions are summed and then averaged to produce the average chromatic length $\overline{\Delta E}$ of the images. The average chromatic length $\overline{\Delta E}$ must be smaller than or equal to four to be acceptable.

(5) To calculate an evaluation value X: The evaluation value X is calculated as follows:

$$X = \frac{A\sigma}{4} \times 100\%,$$

where $\sigma^2 = \sigma_1^2 + \sigma_2^2$, $\sigma^2$ is the total variance, $\sigma_1^2$ is the variance caused by environmental factors, $\sigma_2^2$ is the variance caused by human errors, and A is a yield control constant ranging from 1 to 7. The higher the evaluation value X is, the greater the impacts of the environmental factors and the human errors are.

(6) To determine the influence of the variances: If the evaluation value X is smaller than or equal to 10%, errors resulting from the environmental factors and the human factors have been eliminated. However, if the evaluation value X is greater than 10%, the image capture range must be reset.

A method for testing the stability of an imaging environment was actually carried out in the following manner. To begin with, ten samples were selected, and three operators were randomly assigned to perform the measurement. The results of 100 measurements were computed by a computer to calculate the average chromatic lengths, which were filled in a pre-designed form. In a duration of ten minutes, images were captured by three operators at an interval of six seconds, wherein the capture of images was controlled with of a shutter cable or a computer. The results of analysis of variance (ANOVA) are presented in Table 1.

TABLE 1

ANOVA Table

| Source of variation | Sum of squares (SS) | Degree of freedom (df) | Mean square (MS) | F | P-value | Critical value |
|---|---|---|---|---|---|---|
| Sample (P) | 0.142052 | 9 | 0.015784 | 7.92372 | 2.17E−10 | 1.914648 |
| Operator (O) | 1.979091 | 2 | 0.989545 | 496.7757 | 3.3E−91 | 3.029218 |
| Interaction (PO) | 0.081313 | 18 | 0.004517 | 2.267842 | 0.002745 | 1.64218 |

TABLE 1-continued

ANOVA Table

| Source of variation | Sum of squares (SS) | Degree of freedom (df) | Mean square (MS) | F | P-value | Critical value |
|---|---|---|---|---|---|---|
| (Within-group error) R | 0.537823 | 270 | 0.001992 | | | |
| Total (T) | 2.740278 | 299 | | | | |

With n (sample number)=10, p (number of operators)=3, and k (number of repetitions)=10, $$\sigma_1^2 = \sigma_R^2 = MS_R = 0.001992;$$

$$\sigma_2^2 = \sigma_o^2 = (MS_O - MS_{PO})/n \times k = 0.009876; \text{ and}$$

$$\sigma^2 = \sigma_1^2 + \sigma_2^2 = 0.011867.$$

By setting the coefficient A at 5.15 (representing a percentage defective below 1%), the evaluation value X is calculated as:

$$X = \frac{5.15\sigma}{4} \times 100\% = 14.02576\%.$$

The disclosed method for eliminating chromatic aberration caused by an imaging environment includes the foregoing steps and calculates the evaluation value X through the equations set forth above. If the evaluation value X is smaller than or equal to 10%, errors resulting from the image capture device or human factors have been eliminated. If the evaluation value X is greater than 10%, the step of setting of the image capture range must be performed again. In the embodiment described above, the evaluation value X is 14.02576%>10%, so the procedure returns to Step (1) to reset the image capture range. The above process shall be repeated until the evaluation value X is smaller than 10%, meaning that the parameters contributing to the generation of chromatic aberration by the imaging environment no more exist.

The chromatic aberration calibration device mentioned in the foregoing embodiment is a three-dimensional model having a surface painted with particular colors and marks. The chromatic aberration calibration device is characterized in that the aforesaid method for eliminating chromatic aberration caused by an imaging environment and for testing stability of the imaging environment is used to capture a series of repeated images of this three-dimensional model and thereby analyze the stability of the imaging environment.

Figure 3:
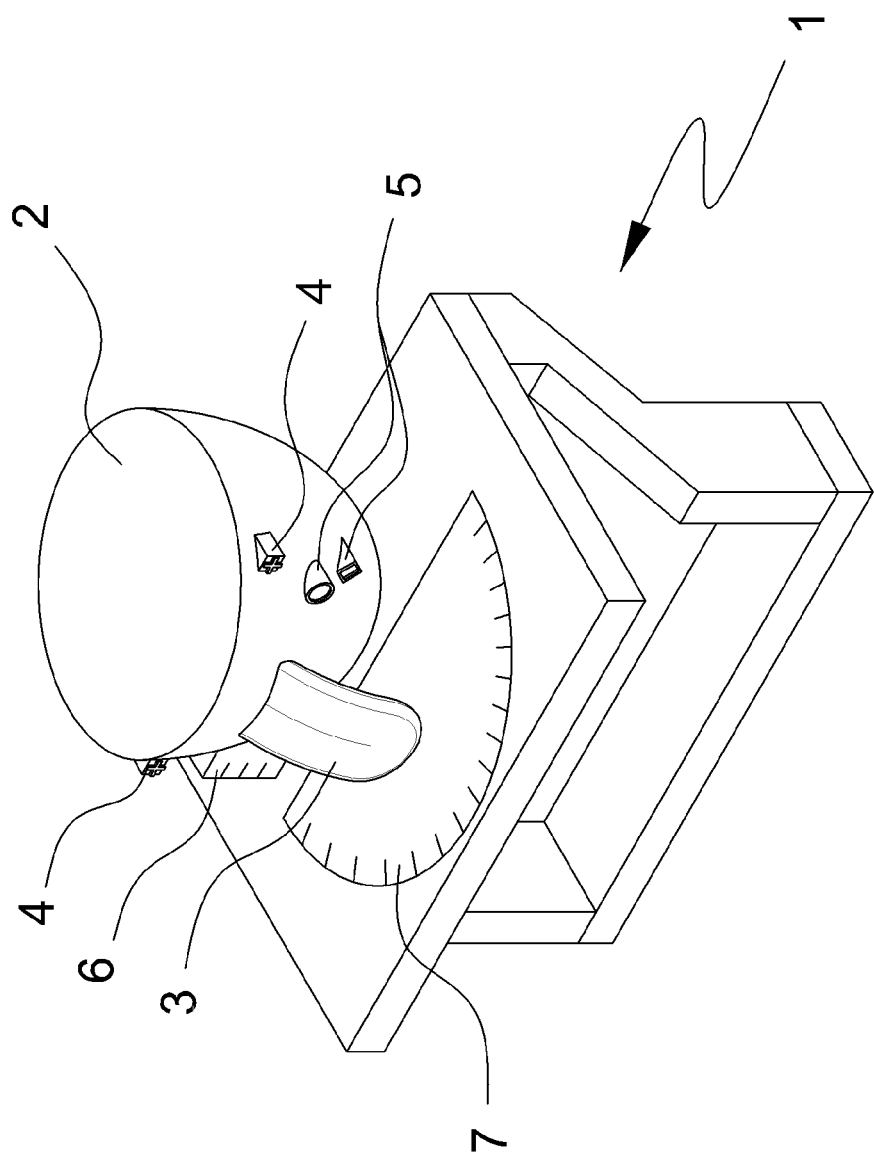
FIG. 3 is a perspective view of the present invention.
Figure 4:
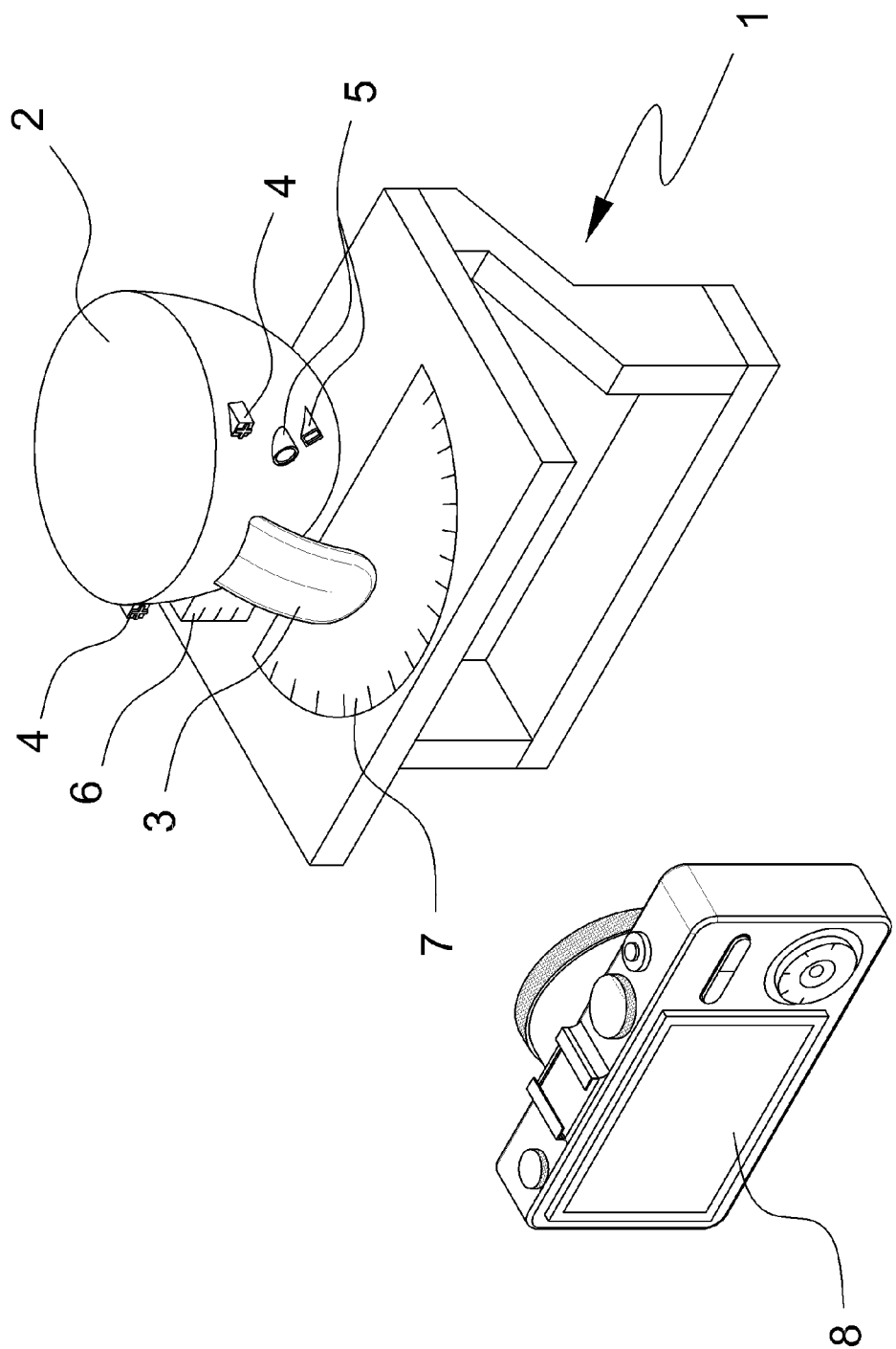
FIG. 4 is a perspective view showing the present invention in use.

FIG. 3 and FIG. 4 illustrate the chromatic aberration calibration device of the present invention in perspective views. As shown in the drawings, a chromatic aberration calibration device 1 for use when taking images of a human body part in an electronic manner essentially includes a semi-ellipsoid 2, two positioning points 4, a set of viewing angle calibration patterns 5, a coordinate scale 6, and an angular measurement scale 7.

The semi-ellipsoid 2 is a hollow three-dimensional model simulating the lower half portion of the human face. A three-dimensional projection 3 is provided on a central portion of the semi-ellipsoid 2 and provides a sharp color contrast with the semi-ellipsoid 2. The sharp color contrast is intended to enhance chromatic aberration of the three-dimensional projection 3 and thereby enhance test results.

The two positioning points 4 are located above the three-dimensional projection 3 and on two lateral sides thereof respectively. The positioning points 4 serve to calibrate the vertices of the upper left and upper right corners of the field of view of an image capture device 8.

The set of viewing angle calibration patterns 5 are provided on the semi-ellipsoid 2 to one side of the three-dimensional projection 3 and include a circle and a square. If the lens of the image capture device 8 is not parallel to the viewing angle calibration patterns 5, the circle in the viewing angle calibration patterns 5 may become elliptical or the square may become diamond-shaped when viewed through the lens.

The coordinate scale 6 is located on one side of the semi-ellipsoid 2 that is opposite the set of viewing angle calibration patterns 5. The coordinate scale 6 divides the three-dimensional projection 3 into three major sections.

The angular measurement scale 7 is connected to a lower portion of the semi-ellipsoid 2 to facilitate measurement of the rotation angle of the semi-ellipsoid 2.

Before the image capture device 8 is used to capture images of a human body part electronically, the operator can use the image capture device 8 to capture a series of repeated images of the chromatic aberration calibration device 1 of the present invention in order to obtain the shooting angle and position that will provide the optimal color contrast between the subject and the background.

For instance, if the operator wishes to take repeated images of the surface condition of a human tongue with a digital camera, the chromatic aberration calibration device 1 of the present invention can be used in the following way so as for the images to be captured to have the optimal color contrast.

The three-dimensional projection 3 of the chromatic aberration calibration device 1 has a bright red color while the semi-ellipsoid 2 is white, which contrasts sharply with the bright red color. In addition, the three-dimensional projection 3 is further processed and painted to simulate a beefy tongue, a geographic tongue, a tofu-like tongue coating, a sticky tongue coating, a stripped tongue coating, or the like, thus serving as a standard model for tongue diagnosis exams or as a standard for tooth color comparison. The sharp color contrast between the three-dimensional projection 3 and the semi-ellipsoid 2 will accentuate chromatic aberration of the three-dimensional projection 3 and thereby enhance test results. To begin with, the operator takes sample images of the chromatic aberration calibration device 1 with the digital camera (i.e., the image capture device 8). While focusing on the three-dimensional projection 3, the vertices of the upper left and upper right corners of the viewfinder of the digital camera are aligned respectively with the two positioning points 4 of the chromatic aberration calibration device 1 so as to maintain the same shooting distance. Meantime, the operator can determine whether the lens of the digital camera (i.e., the image capture device 8) is angularly offset by observing whether the circle in the viewing angle calibration patterns 5 becomes elliptical or the square becomes diamond-shaped. If necessary, the rotation angle of the chromatic aberration calibration device 1 can be adjusted with reference to the angular measurement scale 7 at the lower portion of the semi-ellipsoid 2. The operator can take a series of repeated images at different measurement angles so as for the images to be captured to have the optimal color contrast.

The embodiments described above are only the preferred embodiments of the present invention but are not intended to limit the scope of the present invention, which is defined only by the appended claims.

What is claimed is:

1. A method for eliminating chromatic aberration caused by an imaging environment, wherein the method can eliminate errors resulting from environmental factors or human factors and comprises the steps of:
   (1) setting an image capture range, wherein a distance between an image capture device and a chromatic aberration calibration device and an angle of the image capture device with respect to the chromatic aberration calibration device are calibrated according to a plurality of positioning points provided on the chromatic aberration calibration device;
   (2) capturing images, wherein the image capture device repeatedly captures images of the image capture range of the chromatic aberration calibration device so as to obtain pixel RGB values of a plurality of same positions in the images;
   (3) converting color spaces, wherein the pixel RGB values of the plurality of same positions in the images are converted by a set of color conversion equations into values of a Lab color space;
   (4) calculating an average chromatic length, wherein a chromatic length ΔE of each said position is determined by the following equation:

$\Delta E = \sqrt{(L-L_0)^2 + (a-a_0)^2 + (b-b_0)^2}$, where $(L_0, a_0, b_0)$ is a set of reference values, and $(L, a, b)$ represents the values of the Lab color space obtained from the step (3), the chromatic lengths ΔE of the plurality of same positions being summed and averaged to produce the average chromatic length $\overline{\Delta E}$ of the images, in which the average chromatic length $\overline{\Delta E}$ must be smaller than or equal to four to be acceptable;
   (5) calculating an evaluation value X by the following equation:

$X = \dfrac{A\sigma}{4} \times 100\%$, where $\sigma^2 = \sigma_1^2 + \sigma_2^2$, $\sigma^2$ is a total variance, $\sigma_1^2$ is a variance caused by the environmental factors, $\sigma_2^2$ is a variance caused by the human factors, and A is a yield control constant ranging from 1 to 7, in which the higher the evaluation value X is, the greater the impacts of the environmental factors and the human factors are; and
   (6) determining influence of the variances, wherein if the evaluation value X is smaller than or equal to 10%, the errors resulting from the environmental factors or the human factors have been eliminated, and if the evaluation value X is greater than 10%, the image capture range must be reset.

2. A method for testing stability of an imaging environment, comprising the steps of:
   (1) obtaining image values, wherein an image capture device repeatedly captures images of a portion of a chromatic aberration calibration device so as to obtain pixel RGB values of a plurality of same positions in the images;
   (2) converting color spaces, wherein the pixel RGB values of the plurality of same positions in the images are converted by a set of color conversion equations into values of a Lab color space;
   (3) calculating an average chromatic length, wherein a chromatic length ΔE of each said position is determined by the following equation:

$\Delta E = \sqrt{(L-L_0)^2 + (a-a_0)^2 + (b-b_0)^2}$, where $(L_0, a_0, b_0)$ is a set of reference values, and $(L, a, b)$ represents the values of the Lab color space obtained from the step (2), the chromatic lengths ΔE of the plurality of same positions being summed and averaged to produce the average chromatic length $\overline{\Delta E}$ of the images, in which the average chromatic length $\overline{\Delta E}$ must be smaller than or equal to four to be acceptable; and
   (4) calculating an evaluation value X by the following equation:

$X = \dfrac{A\sigma}{4} \times 100\%$, where $\sigma^2 = \sigma_1^2 + \sigma_2^2$, $\sigma^2$ is a total variance, $\sigma_1^2$ is a variance caused by environmental factors, $\sigma_2^2$ is a variance caused by human errors, and A is a yield control constant ranging from 1 to 7, in which the higher the evaluation value X is, the greater the impacts of the environmental factors and the human errors are.

3. The method of claim 2, wherein the image capture device is a camera, a CCD camera, or a web video device.

4. A chromatic aberration calibration device for use when taking images of a human body part electronically, the chromatic aberration calibration device essentially comprising:
   a semi-ellipsoid formed as a hollow three-dimensional model imitating a lower half portion of a human face, the semi-ellipsoid having a central portion provided with a three-dimensional projection;
   two positioning points located above the three-dimensional projection and on two lateral sides thereof respectively so as to calibrate vertices of an upper left corner and an upper right corner of a field of view of an image capture device;
   a set of viewing angle calibration patterns provided on the semi-ellipsoid to a side of the three-dimensional projection and comprising a circle and a square;
   a coordinate scale located on a side of the semi-ellipsoid that is opposite the set of viewing angle calibration patterns; and
   an angular measurement scale connected to a lower portion of the semi-ellipsoid so as to facilitate measurement of a rotation angle of the semi-ellipsoid;
   wherein while the image capture device captures a series of repeated images of the chromatic aberration calibration device, a lens of the image capture device is parallel to the set of viewing angle calibration patterns if the circle and the square, when viewed through the lens, are circular and square respectively, and is otherwise if the circle looks elliptical or the square looks diamond-shaped through the lens, and the rotation angle of the chromatic aberration calibration device is adjusted accordingly so as for images to be captured to have optimal color contrast.

5. The chromatic aberration calibration device of claim 4, wherein the three-dimensional projection is in sharp contrast with the semi-ellipsoid in color.

6. The chromatic aberration calibration device of claim 4, wherein the coordinate scale divides the three-dimensional projection into three major sections.

* * * * *